United States Patent [19]
Takeuchi

[11] 3,834,039
[45] Sept. 10, 1974

[54] AUTOMATIC DIAPHRAGM SETTING DEVICE FOR CAMERA

[75] Inventor: Hideo Takeuchi, Kozakai, Japan

[73] Assignee: Minolta Camera Kabushiki Kaisha, Osaka, Japan

[22] Filed: July 26, 1973

[21] Appl. No.: 383,028

[30] Foreign Application Priority Data
Aug. 12, 1972 Japan.............................. 47-94996

[52] U.S. Cl...................... 354/42, 354/43, 354/271
[51] Int. Cl........................... G03b 9/00, G03b 9/62
[58] Field of Search .......... 95/10 C, 10 CE, 10 CT, 95/10 CD, 53 E, 64 R, 64 D; 354/42, 43, 271

[56] References Cited
UNITED STATES PATENTS
| | | | |
|---|---|---|---|
| 3,511,145 | 5/1970 | Ort.................................. | 95/10 CD |
| 3,645,186 | 2/1972 | Kitai................................. | 95/10 CT |
| 3,714,871 | 2/1973 | Bresson........................... | 95/10 CD |

Primary Examiner—Samuel S. Matthews
Assistant Examiner—Russell E. Adams, Jr.
Attorney, Agent, or Firm—Wolder & Gross

[57] ABSTRACT

A camera automatic aperture setting device includes an electromagnet adapted to be excited by a release operation and to be deexcited when the resistance values of the light receptive element and of a resistor included in a controlling electric ciruit are balanced, an attraction member attracted and held by excitement of the electromagnet, a diaphragm adjusting member adapted to be operated after the electric circuit has been closed by release operation and to operate a diaphragm opening member, and a member that imparts friction torque to the operation of the diaphragm opening member. The adjusting member rotates around a first pivot held in fixed position by the attraction member and operates the diaphragm opening member while the magnet is excited, and rotates around a second pivot that connects the diaphragm opening member to the diaphragm adjusting member when the magnet is deexcited, and determines a diaphragm aperture upon the deexcitement of the magnet.

3 Claims, 2 Drawing Figures

3,834,039

AUTOMATIC DIAPHRAGM SETTING DEVICE FOR CAMERA

BACKGROUND OF THE INVENTION

This invention relates to an automatic diaphragm setting device in a camera, and more particularly to an automatic diaphragm setting device for determining a diaphragm aperture by deexcitement of an electromagnet in a camera in which is used a known exposure controlling electric circuit comprising an electric circuit, light receptive element, electromagnet, transistor, resistor, and the like.

Many of the proposals that have heretofore been made as to the device of the kind described is of the structure in which a diaphragm aperture is determined by stopping a diaphragm adjusting member through excitement or deexcitement of an electromagnet by an electric signal in the position in which it reached a desired aperture value. As an embodiment of such a device it is proposed for example in Japanese Patent Publication No. 11705/1966 that teeth are formed on the circumference of the diaphragm adjusting member and an engagement member operable by excitement (or deexcitement) of an electromagnet is disposed in opposed relation with the teeth, the engagement member being brought into engagement with the teeth either by excitement (or deexcitement) of the magnet to thereby stop the operation of the diaphragm adjusting member or by direct attraction of the diaphragm adjusting member by the electromagnet to thereby stop the operation of the member.

But the proposed methods make it necessary that there be a space either between the diaphragm adjusting member and the engagement member or between the diaphragm adjusting member and the electromagnet during the operation of the diaphragm adjusting member, namely during the time until which the diaphragm adjusting member is stopped for the reason described above, which space is large enough to allow the adjusting member to operate therein and also to allow both members to make engagement with and disengagement from each other. Accordingly, there was developed a mechanical delay in operation from the time at which an electric signal was produced for exciting the electromagnet until the time at which the diaphragm adjusting member was stopped and it was difficult to obtain a precise diaphragm aperture.

Accordingly, in order to compensate this delay in operation, it is necessary to suppress the speed of operation of the diaphragm adjusting member below the specified speed and a means to control the speed of operation of the member, such as a governor mechanism, is used. Also, a means to restrict the aforestated space for operation to a minimum of requirement is employed.

But the means of the kind described involve disadvantages such as complicated diaphragm setting mechanism or rigid control over the dimensional precision of the parts used in the mechanism.

SUMMARY OF THE INVENTION

An object of this invention is to provide an automatic diaphragm setting device in which, when an electromagnet is deexcited by an electric signal, operation of a diaphragm opening member that is moving diaphragm blades in the direction of opening the diaphragm is immediately stopped to thereby prevent the mechanical delay in operation from the time at which an electrical signal was produced until the time at which the diaphragm aperture is determined.

Another object of the invention is to provide the device described above which is simplified in construction to a maximum.

This invention essentially comprises a diaphragm adjusting member operated by a shutter release, an attraction member adapted to be attracted by an electromagnet while the magnet is in excitement, a diaphragm opening member for operating diaphragm blades in conjunction with the diaphragm adjusting member, and a member that imparts friction torque to the rotation of the diaphragm opening member.

The diaphragm adjusting member rotatably engages with a pin in the form of a first pivot protrudingly formed on the attraction member, or brings a pin in the form of a first pivot protrudingly formed on the diaphragm adjusting member into engagement with the attraction member and is furthermore connected rotatably to a diaphragm opening member through a connecting pin in the form of a second pivot.

In this manner, while the electromagnet is excited by release operation of a shutter to thereby attract the attraction member to the electromagnet, the diaphragm adjusting member rotates around the first pivot held in fixed position by the attraction member to thereby bring the diaphragm opening member into action against the friction torque imparted to the opening member.

Thereafter, because the attraction with respect to the attraction member is lost by deexcitement of the electromagnet to thereby move the attraction member and to release the first pivot from fixation, the diaphragm adjusting member rotates around the second pivot and causes the attraction member to shift together with the pin. When the diaphragm adjusting member is rotated around the connecting pin, a diaphragm opening member is stopped by a member that is imparting friction torque to the diaphragm opening member and thus determines a diaphragm aperture.

The diaphragm adjusting member, upon release operation, rotates first around the pin held by the attraction member in fixed position, opens the diaphragm, and simultaneously with deexcitement of the magnet by an electric signal, rotates around the connecting pin and loses control over the diaphragm opening member, whereby the diaphragm aperture is determined and that mechanical delay is prevented which occurs from the time at which the electric signal was produced until the time at which the diaphragm aperture is determined.

According to the invention, there is no necessity of an additional mechanism such as a governor mechanism, with the result that the invention is simplified in structure and also reduced in the space to receive the device therein, thus being useful particularly as an automatic diaphragm setting device for a super-miniature camera.

Other objects and features of the invention will become apparent from the following description thereof taken in conjunction with the accompanying drawing.

DESCRIPTION OF THE PREFERRED EMBODIMENTS

Figure 1:
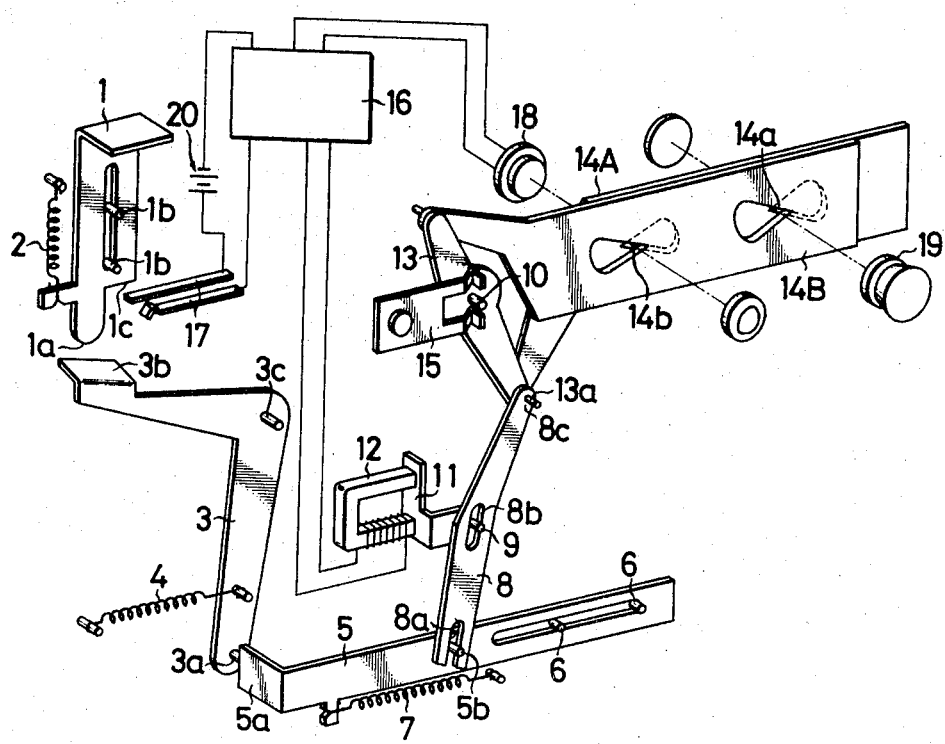
FIG. 1 is a perspective view showing the essential parts of an embodiment of this invention.

In FIG. 1, a release member 1 is vertically movably supported by a camera body (not shown) through guide pins 1b and is urged upward by a spring 2. An intermediary member 3 is pivotally secured by a pin 3c to the camera body, with a bent bearing lug 3b faced below the lower end 1a of the release member 1, and is urged by a spring 4 in a clockwise direction. At the lower end of the interdemdiary member 3 is protrudingly formed a pin 3a, which is engaged with a bent part 5a of a diaphragm operating member 5.

The diaphragm operating member 5 is laterally movably supported by the camera body through a pair of pins 6, and is urged to the right side by a spring 7 weaker in force than the spring 4 acting on the intermediary member 3, and brings the bent part 5a into engagement with the pin 3a so as to follow the direction of the intermediary member 3 when the member 3 is rotated counterclockwise.

Furthermore, on the diaphragm operating member 5 is protrudingly formed a pin 5b, which is engaged in the fork of a forked member 8a formed at the lower end of a diaphragm adjusting member 8.

The diaphragm adjusting member 8 is formed in about the middle of the longitudinal direction thereof with a slot 8b, which receives a pin 9 in the form of a first pivot protrudingly formed on an attraction member 11 placed in opposing relation with respect to the attraction face of an electromagnet 12, and the member 8 is adapted to rotate around the pin 9 on the attraction member attractedly held by the magnet 12 while the magnet is excited. The pin 9 may be protrudingly formed on the diaphragm adjusting member 8 and may be engaged with the attraction member 11. The top end part 8c of the adjusting member 8 is connected to the lower end of the diaphragm opening member 13 through a connecting pin 13a in the form of a second pivot and is designed to rotate around the connecting pin 13a.

The diaphragm opening member 13 is pivotally secured in the middle by a pin 10 to the camera body, and arms of the diaphragm blades 14A and 14B are connected to the upper and lower ends of the member 13 in such a manner that rotation of the member 13 can slide the blades 14A and 14B in opposite directions with respect to each other. The diaphragm opening member 13 has the working end of a leaf spring 15 brought into contact with the surface of the member 13, in order to provide a frictional force for regulating the torque of the member 13 above a specified value. Namely, the leaf spring 15 works as a member that imparts friction torque to the diaphragm opening member 13.

The relation of amount of force between the friction torque and the spring 7 urging the diaphragm operation member 5 to thereby serve as a rotational force of the diaphragm adjusting member 8 is established in such a manner that, when the diaphragm adjusting member 8 rotates around the pin 9, the rotational force at that time overcomes the friction torque, brings the diaphragm opening member 13 into rotation, and that then in the state in which, upon deexcitement of the magnet 12, the center of of rotation of the diaphragm adjusting member 8 has been shifted from the pin 9 to the connecting pin 3a, friction torque by the leaf spring 15 is stronger than that force of rotation from the diaphragm adjusting member 8 which works around the connecting pin 13a and makes the diaphragm opening member 13 stop in its position.

A diaphragm opening 14a is varied in its diameter according to the sliding in opposite directions to each other of the two diaphragm blades 14A and 14B caused by rotation of the diaphragm opening member 13, and thus determines the stop of the lens 19.

On the other hand, a light receptive element 18 is controlled by a light receptive diaphragm 14b similarly variable in aperture by the sliding of the diaphragm blades 14A and 14B and receives light from an object.

The diaphragm aperture and the light receptive diaphragm aperture are of course set so as to be related to each other at a prespecified rate.

In a circuit unit 16 for controlling the electromagnet 12 in accordance with the amount of light received by the light receptive element 18 are included a transistor, resistor (not shown), etc., and depression of a release member 1 presses the movable piece of a main switch 17 by the shoulder portion 1c of the member 1 to close the switch 17 and to thereby flow electric current to the coils of the magnet 12 from power source 20 and excite the magnet 12, and when the light received by the light receptive element 18 reaches a predetermined amount, the current that keeps the magnet 12 excited is shut off by the known operation of the circuit unit 16.

The main switch 17 is designed to be closed by the release member 1 before the lower end 1a of the member 1 comes into contact with the bent bearing lug 3b. Also, closing and opening of the main switch 17 need not necessarily be interlocked with the release member 1 but may be modified in design so as to be carried out by other operation members.

FIG. 1 shows the arrangement of the members in which the camera is set ready for photographing.

In FIG. 1, when the release member 1 is depressed, the main switch 17 is closed to thereby excite the electromagnet 12, and accordingly an attraction member 11 is attracted by the magnet 12. Because the release member 1 is further depressed, the lower end 1a of the member 1 presses the lug 3b to rotate the member 3 counterclockwise, whereby the diaphragm operating member 5 moves to the right by being urged by the spring 7 to follow the member 3 and thus rotates the diaphragm adjusting member 8 counterclockwise.

The diaphragm adjusting member 8, because the attraction member 11 is attracted by the magnet 12, makes the counterclockwise rotation around the pin 9 fixed in position by the member 11 and causes the diaphragm opening member 13 to rotate clockwise around the pin 10 through the connecting pin 13a. It is previously stated that this rotation is effected by overcoming the friction torque imparted by the leaf spring 15 to the diaphragm opening member 13. In this manner, the diaphragm opening 14a and light receptive diaphragm 14b are opened.

When the light receptive diaphragm 14b starts opening and thus light receptive element 18 receives light from an object and the diaphragm 14b is further opened so that the amount of light to be received by the element 18 reaches the predetermined amount of light, the circuit 16 shuts off the current exciting the magnet 12, with the result that the magnet 12 is deexcited.

By the deexcitement of the magnet 12 the attraction member 11 is released from the attraction of the magnet. Because the diaphragm opening member 13, as described, is placed under friction torque imparted thereto by the leaf spring 15 and because on the other hand the magnetic force of attraction that acted on the attraction member 11 is removed, the diaphragm adjusting member 8 rotating counterclockwise around the pin 9 by the diaphragm operating member 5 which is urged to move to the right by the action of the spring 7 is changed over to counterclockwise rotation around the connecting pin 13a simultaneously with said deexcitement, and moves the member 11 through the pin 9 away from the attraction face of the magnet 12.

On the other hand, the friction torque of the leaf spring 15 acting upon the diaphragm opening member 13 stops the rotation of the member 13 in the state of the diaphragm adjusting member 8 rotating around the connecting pin 13a and maintains a diaphragm aperture.

Namely, as soon as the magnet 12 has been deexcited, the clockwise rotation of the diaphragm opening member 13 is stopped and retains the diaphragm opening 14a at an aperture diameter corresponding to the brightness of an object, and accordingly, mechanical delay in operation from the time at which an electric signal for deexciting the magnet 12 is produced until the time at which the blades 14A and 14B stop has been eliminated.

Thereafter, a shutter device (not shown) functions and finishes photographing, and when the depressing force of the release member 1 is removed, the member 1 is restored to its upper position by a spring 2 and, together therewith, the intermediary member 3 is brought into clockwise rotation by the action of a spring 4. Also, the main switch 17 is opened.

Clockwise rotation of the intermediary member 3 pushes the bent portion 5a by means of the pin 3a and moves the member 5 to the left by overcoming the force of the spring 7. In accordance therewith, the diaphragm adjusting member 8 is brought into clockwise rotation around the connecting pin 13a to thereby press the attraction piece 11 against the attraction face of the magnet 12.

Pressing of the attraction piece 11 against the attraction face of the magnet 12 prevents the clockwise rotation of the diaphragm adjusting member 8 around the connecting pin 13a, but the diaphragm operating member 5 is moved by the intermediary member 3 still further to the left. Because of this, the attraction member 11 is pressed against the attraction face of the magnet 12 and at the same time the rotation of the diaphragm adjusting member 8, in turn, shifts around the pin 9 fixed in position by the fixation of the attraction member 11, and the member 8 rotates clockwise around the pin 9. Thus, the diaphragm opening member 13 is rotated counterclockwise against the action of the friction torque imparted thereto by the leaf spring 15 and causes the diaphragm blades 14A and 14B to slide in opposite directions with respect to each other to thereby make the diaphragm opening 14a and light receptive diaphragm aperture 14b open in their minimal diameters or close the same, the members ending their operation and being brought into the state shown in FIG. 1.

Figure 2:
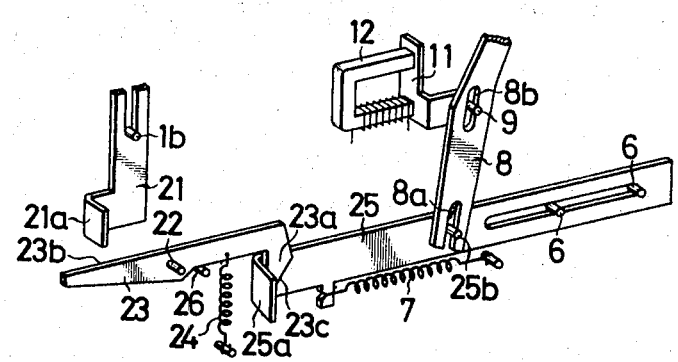
FIG. 2 is a perspective view of another embodiment, showing modified parts alone.

FIG. 2 is a partial view showing only a modified part of the embodiment in which, instead of the intermediary member 3 of the first described embodiment in FIG. 1, a diaphragm operating member 25 is disposed so as to be placed by an engagement member 23 in a ready-to-operate position. Incidentally, the same members as those of FIG. 1 are indicated by the same characters.

In FIG. 2, depression of a release member 21 closes the main switch (see FIG. 1) and thereafter a bent lug 21a at the lower end of the member 21 depresses the upper side 23b of an engagement member 23 to thereby rotate the member 23 around a pin 22 thereof counterclockwise against the action of a spring 24, whereby a hook portion 23a of the member 23 moves upwardly and is disengaged from a bent lug 25a of a diaphragm operating member 25.

Accordingly, the diaphragm operating member 25 moves to the right by the action of a spring 7, causes the diaphragm adjusting member 8 to rotate counterclockwise through a pin 25b of the member 25, and the member 8 first rotates counterclockwise around the pin 9 in the same manner as described with reference to FIG. 1, and upon deexcitement of the magnet 12, makes clockwise rotation around the connecting pin (see FIG. 1) in the form of a second pivot, in the same manner as in FIG. 1.

In this manner, it is not only useful for the reduction of the stroke and force of depression in depressing the release member 21 but becomes an effective means in point of design to dispose the engagement member 23 as shown in place of the intermediary member 3 in FIG. 1.

In this case, when the release member 21 is returned to its upper position, the engagement member 23 is rotated clockwise by the action of the spring 24 in the state in which the engagement member 23 follows in the wake of the member 21 and returns to its position, and stops against a stopper 26, but the diaphragm operating member 25 is not returned to its original position.

Accordingly, the operating member 25 is constructed in such a manner that the member 25 is interlocked with a shutter setting member (not shown) in setting a shutter, and is moved to the left together with setting of the shutter, and places the slope 23c of hook portion 23a beyond the course of rotation of the member 23 by pushing the slope 23c by the upper edge of the bent lug 25a so that the hook portion 23a reaches the position shown and is brought into engagement with the bent lug 25a by the action of the spring 24.

The action of the kind described above may be interlocked with a shutter setting mechanism and also with a release member return interlocking mechanism and the like.

A means to shut off the current to the magnet 12 when the diaphragm aperture has reached a desired diameter may be provided by the structure in which, besides the disposition of the light receptive diaphragm in front of the light receptive element 18, for example the light receptive element is balanced with a sliding resistance.

What is claimed is:

1. An automatic diaphragm setting device for a photographic camera including:
    an electromagnet having an attraction face;
    an electric circuit for controlling said electromagnet and including a main switch and exciting said electromagnet upon closing of said main switch, said circuit including a light receptive element and a circuit unit connected to shut off the electric current to said electromagnet in response to the resistance of the light receptive element a given value;
    an attraction member disposed in opposing relation with the attraction face of said electromagnet and adapted to be attracted and fixed by excitement of the electromagnet, released from the attraction of said electromagnet by deexcitement and movable when so released;
    a first pivot fixed in a first position when said attraction member is attracted by said electromagnet and movable from said first position when said attraction member is released from said electromagnet;
    first and second diaphragm means;
    a diaphragm opening member adapted to vary the apertures of said first and second diaphragm means;
    a member imparting friction torque to the operation of said diaphragm opening member;
    a second pivot movable for driving said diaphragm opening member; and
    a diaphragm adjusting member operatively connected to said diaphragm opening member and said second pivot, said diaphragm adjusting member being adapted to pivot about said first pivot when said first pivot is in said first position to enable said second pivot to drive said diaphragm opening member, and to prevent said diaphragm adjusting member from pivoting about said first pivot when said first pivot is released from said first position to thereby disable said second pivot from driving said diaphragm opening member.

2. An automatic diaphragm setting device according to claim 1 including a release member and an intermediary member adapted to operate said diaphragm adjusting member after said electric circuit has been closed, said intermediary member being operated by depression of said release member.

3. An automatic diaphragm setting device according to claim 2 wherein said intermediary member has a hook portion for engaging said diaphragm adjusting member prior to depression of said release.

* * * * *

UNITED STATES PATENT OFFICE
CERTIFICATE OF CORRECTION

PATENT NO. : 3,834,039
DATED : September 10, 1974
INVENTOR(S) : Hideo Takeuchi

It is certified that error appears in the above-identified patent and that said Letters Patent are hereby corrected as shown below:

Claim 1, line 10: After the word "element" insert the word --reaching--.

Signed and Sealed this twenty-sixth Day of August 1975

[SEAL]

Attest:

RUTH C. MASON
Attesting Officer

C. MARSHALL DANN
Commissioner of Patents and Trademarks